US012439944B2

(12) United States Patent
Clarke

(10) Patent No.: US 12,439,944 B2
(45) Date of Patent: *Oct. 14, 2025

(54) 3-HYDROXYBUTYRATE COMPOUNDS FOR USE IN REDUCING LIVER FAT

(71) Applicant: TDeltaS Limited, Thame (GB)

(72) Inventor: Kieran Clarke, Oxford (GB)

(73) Assignee: TDeltaS Limited, Thame (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/626,293

(22) PCT Filed: Jun. 22, 2018

(86) PCT No.: PCT/GB2018/051752
§ 371 (c)(1),
(2) Date: Dec. 23, 2019

(87) PCT Pub. No.: WO2019/002828
PCT Pub. Date: Jan. 3, 2019

(65) Prior Publication Data
US 2020/0113220 A1    Apr. 16, 2020

(30) Foreign Application Priority Data

Jun. 27, 2017  (GB) .................................... 1710229

(51) Int. Cl.
*A23L 33/10* (2016.01)
*A23L 33/00* (2016.01)

(52) U.S. Cl.
CPC .............. *A23L 33/10* (2016.08); *A23L 33/30* (2016.08); *A23V 2002/00* (2013.01)

(58) Field of Classification Search
CPC ...... A23L 33/10; A23L 33/30; A23V 2002/00
See application file for complete search history.

(56) References Cited

U.S. PATENT DOCUMENTS

| 6,323,237 | B1 | 11/2001 | Veech |
| 8,642,654 | B2 | 2/2014 | Clarke et al. |
| 2007/0208081 | A1 | 9/2007 | Gross |
| 2007/0286916 | A1* | 12/2007 | Bengmark ........... A61K 35/747 424/780 |
| 2009/0253781 | A1 | 10/2009 | Veech |
| 2011/0237666 | A1 | 9/2011 | Clarke et al. |
| 2012/0322719 | A1* | 12/2012 | Pavlov .................... A61K 31/46 514/642 |
| 2015/0164855 | A1* | 6/2015 | Clarke .................... A61P 21/00 514/460 |
| 2015/0283163 | A1 | 10/2015 | Rayburn et al. |
| 2016/0108442 | A1* | 4/2016 | Adelstein ........... C12Y 101/011 435/135 |
| 2016/0263098 | A1* | 9/2016 | Mantzoros ................ A61P 1/16 |
| 2017/0296501 | A1 | 10/2017 | Lowery |
| 2017/0327560 | A1* | 11/2017 | Armstrong ................ A61P 3/04 |
| 2018/0008629 | A1 | 1/2018 | Dixit |

FOREIGN PATENT DOCUMENTS

| CN | 105377246 A | 3/2016 |
| GB | 2517088 A | 2/2015 |
| JP | 2001-515510 A | 9/2001 |
| JP | 2001-527101 A | 12/2001 |
| JP | 2004-507572 A | 3/2004 |
| JP | 2012-500264 A | 1/2012 |
| WO | WO 2004/108740 A2 | 12/2004 |
| WO | WO 2006/020137 A2 | 2/2006 |
| WO | WO2006020179 A1 | 2/2006 |
| WO | WO2008110034 A1 | 9/2008 |
| WO | WO2009089144 A1 | 7/2009 |
| WO | WO 2010/021766 * | 2/2010 |
| WO | WO2010021766 A1 | 2/2010 |
| WO | WO 2011/078204 A1 | 6/2011 |
| WO | WO2014140308 A1 | 9/2014 |
| WO | WO2014153416 A1 | 9/2014 |
| WO | WO2014190251 A1 | 11/2014 |
| WO | WO 2016/123229 * | 8/2016 |
| WO | WO 2016/123229 A1 | 8/2016 |
| WO | WO2017184788 A1 | 10/2017 |
| WO | WO2019002828 A1 | 1/2019 |

OTHER PUBLICATIONS

Jacobs et al. (FASEB (2013) 27: issue S1) (Year: 2013).*
Henderson et al. (http://patient.info/doctor/steatohepatitis-and-steatosis-fatty-liver (last edited Aug. 31, 2016)). (Year: 2016).*
Jacobs et al, "Creatine Supplementation may prevent NAFLD by stimulating fatty acid oxidation", & Joint Annual Meeting of the ASPET/BPS At Experimental Biology (EB); Boston, MA, USA; Apr. 20-24, 2013 col. 27, Apr. 1, 2013 (Apr. 1,2 013), FASEB Journal, Abstract only. Retrieved from the Internet: URL:https://www.fasebj.org/doi/abs/10.1096/fasebj.27.1_supplement.222.2.
International Search Report and Written Opinion of corresponding PCT/GB2018/051752, dated Oct. 17, 2018, 14 pages.
Szczepaniak, et al., "Magnetic Resonance Spectroscopy to Measure Hepatic Triglyceride Content: Prevalence of Hepatic Steatosis in the General Population", Am J Physiol Endocrinol Metab, 288:E462-E468, 2005.
Fracanzani, et al., "Risk of Nonalcoholic Steatohepatitis and Fibrosis in Patients with Nonalcoholic Fatty Liver Disease and Low Visceral Adiposity", Author Manuscript, available at http://hdl.handle.net/2318/83956, 24 pp. (subsequently published at Journal of Hepatology, vol. 54, Issue 6, 2011) doi:10.1016/j.jhep.2010.09.037.
Das, et al., "Nonobese Population in a Developing Country Has a High Prevalence of Nonalcoholic Fatty Liver and Significant Liver Disease", Hepatology, 2010:1593-1602.

(Continued)

*Primary Examiner* — Marcos L Sznaidman
(74) *Attorney, Agent, or Firm* — Finnegan, Henderson, Farabow, Garrett & Dunner, LLP

(57) ABSTRACT

The present invention provides a compound for use in reducing liver fat in a subject, wherein the compound is selected from: (i) (R)-3-hydroxybutyrate; (ii) an ester of (R)-3-hydroxybutyrate; and (iii) an oligomer obtainable by polymerising (R)-3-hydroxybutyrate moieties; or a pharmaceutically acceptable salt or solvate thereof. The compound is particularly useful in subjects suffering from a fatty liver. The compound can be used to treat non-alcoholic fatty liver disease (NAFLD), non-alcoholic steatohepatitis (NASH), alcoholic steatohepatitis (ASH) or non-alcoholic fatty liver (NAFL).

20 Claims, 3 Drawing Sheets

(56) References Cited

OTHER PUBLICATIONS

Kemper, et al., "An Ester of B-Hydroxybutyrate Regulates Cholesterol Biosynthesis in Rats and a Cholesterol Biomarker in Humans", Lipids (2015) 50:1185-1193.
Unknown, "Keto forum: The Best Fatty Liver Diet", 18 pages, downloaded Aug. 15, 2018 from https://www.ruled.me/keto-best-fatty-liver-diet.
Machado, et al., "No Need for a Large Belly to Have NASH", Journal of Hepatology, 2011, 54:1090-1093.
Margariti, et al., "Non-alcoholic Fatty Liver Disease May Develop in Individuals with Normal Body Mass Index", Annals of Gastroenterology (2012) 25:45-51.
Pavlides, et al., "Multiparametric Magenetic Resonance Imaging Predicts Clinical Outcomes in Patients with Chronic Liver Disease", Journal of Hepatology, 2016, 64:308-315.
Pawlak, et al., "Ketone Body Therapy Protects from Lipotoxicity and Acute Liver Failure Upon Ppara Deficiency", Mol Endocrinol, 2015, 29(8):1134-1143.
Thomas, et al., "Hepatic Triglyceride Content and its Relation to Body Adiposity: a Magnetic Resonance Imaging and Proton Magnetic Resonance Spectroscopy Study", Gut, 2005, 54:122-127.
Frayne, "Metabolic Regulation A Human Perspective", 2d Edition, 2003, pp. 94-96.
Rossi et al., "Suppression of feed intake after parenteral administration of D-B-hydroxybutyrate in pygmy goats", Journal of Veterinary Medicine A, vol. 47, No. 1, 2000, pp. 9-16.
Gibson et al., "Do ketogenic diets really suppress appetite? A systematic review and meta-analysis", Obesity Reviews, 16:64-76 (2015).
Sumithran et al., "Ketosis and appetite-mediating nutrients and hormones after weight loss", European Journal of Clinical Nutrition (2013) 67:759-764.
Johnstone et al., "Effects of a high-protein ketogenic diet on hunger, appetite and weigh loss in obese men feeding ad libitum", Am J Clin Nutr, 87:44-55 (2008).
Paoli et al., "Ketosis, ketogenic diet and food intake control: a complex relationship", Frontiers in Psychology, vol. 6, Article 17, pp. 1-9, 2015.
Chearskul et al., "Effect of weight loss and ketosis on postprandial cholecystokinin and free fatty acid concentrations", Am J Clin Nutr,2008:87:1238-46.
Clarke et al., "Kinetics, safety and tolerability of (R)-3-hydroxybutyl (R)-3-hydroxybutyrate in healthy adult subjects", Regulatory Toxicology and Pharmacology, 63:401-408 (2012).
Chacko et al., "Effect of ghrelin on glucose regulation in mice", Am J Physiol Endocrinol Metab 302: E1055-E1062, 2012.
Stubbs et al., "A ketone ester drink lowers human ghrelin and appetite", Obesity, vol. 26, No. 2, 2018, pp. 29-273.
Pawan et al., "Effects of 3-hydroxybutyrate on obese subjects on very-low-energy diets", The Lancet, Jan. 1983, Elsevier, vol. 321, pp. 15-17.
Srivastava et al., "Mitochondroial biogensis and increased uncoupling protein 1 in brown adipose tissue of mice fed a ketone ester diet", The FASEB Journal; vol. 26, No. 6, 2012, pp. 2351-2362.
GB Search Report dated Mar. 21, 2019, issued in GB Application No. GB1815588.7.
GB Search Report dated May 22, 2018 issued in GB Application No. GB1715654.8.
International Preliminary Report on Patentability dated Mar. 31, 2020, issued in PCT/GB2018/052717, 9 pages.
Wade, A and Weller, PJ, "Handbook of Pharmaceutical Excipients, 2d Edition" 1994.
UK Patent Office action issued dated Jan. 27, 2021, issued in GB Patent Application No. 1815588.7, 5 pages.
Translation of Taiwanese Office Action dated May 18, 2022 (previously submitted) for corresponding Taiwanese Patent Application No. 107121496, 3 pages.
Taiwanese Office Action dated May 18, 2022 for corresponding Taiwanese Patent Application No. 107121496, 8 pages and English translation of Search Report received in connection with corresponding Taiwanese Patent Application No. 107121496 (Ex—PCT/GB2018/051752), 1 page.
Examination Report for Corresponding European Application No. 18 737 388.1, dated Oct. 26, 2021, 4 pages.
International Search Report of corresponding PCT/GB2019/052797, dated Jan. 3, 2020, 4 pages.
Cox et al., "Nutritional Ketosis Alters Fuel Preference and Thereby Endurance Performance in Athletes", Cell Metabolism, Cell Press, vol. 24, No. 2, Jul. 27, 2016, p. 256-268, XP029680184.
Holdsworth et al., "A Ketone Ester Drink Increases Postexercise Muscle Glycogen Synthesis in Humans", Medicine and Science in Sports and Exercise, vol. 49, No. 9, Sep. 1, 2017, p. 1789-1795, XP055649184.
Kreher et al., "Overtraining Syndrome: A Practical Guide", Sports Health: a Multidisciplinary Approach, vol. 4, No. 2, Jan. 31, 2012, p. 128-138, XP055649498.
Parker et al., "Beta-hydroxybutyrate favorably alters muscle cell survival and mitochondrial bioenergetics", Apr. 1, 2017, Retrieved from the Internet: URL:https://www.fasebj.org/doi/abs/10.1096/fasebj.31.1_supplement.883.7, XP055649476.
Thomsen et al., "Effects of 3-hydroxybutyrate and free fatty acids on muscle protein kinetics and signaling during LPS-induced inflammation in humans: anticatabolic impact of ketone bodies", The American Journal of Clinical Nutrition, vol. 108, No. 4, Oct. 1, 2018, p. 857-867, XP055649308.
Extended European Search Report for corresponding European Patent Application No. 23161905.7, dated Jun. 5, 2023, 8 pages.
Korean Office Action for Korean Application No. 10-2020-7002473, dated Aug. 7, 2023, 4 pages, and English Translation.
Tieu, Kim, et al., "D-β-Hydroxybutyrate rescues mitochondrial respiration and mitigates features of Parkinson disease," The Journal of Clinical Investigation, 2003; 112(6):892-901.
Tsai, Yih-Chiao et al., "Stereoselective effects of 3-hydroxybutyrate on glucose utilization of rat cardiomyocytes," Life Sciences 78 2006, 1385-1391.
Taiwanese Office Action for Application No. 107121496, dated Nov. 10, 2022 and English Translation.
Chinese Office Action for Corresponding Application No. CN201880042880.5, dated Jun. 21, 2022 (6 pages) and English translation (11 pages).
Search Report for Corresponding Application No. CN201880042880.5, dated Jun. 15, 2022, 3 pages.
Japanese Office Action dated Jun. 28, 2022 for corresponding Japanese Patent Application No. 2019-572783 and English Translation (15 pages).
Chinese Office Action for Application No. 201880042880.5, dated Dec. 14, 2022, 6 pages and English translation, 4 pages.
Taggart, et al., "(D)-β-Hydroxybutyrate Inhibits Adipocyte Lipolysis via the Nicotinic Acid Receptor PUMA-G," *The Journal of Biological Chemistry*, vol. 280, No. 29, Issue of Jul. 2022, pp. 26649-26652, 2005.

\* cited by examiner

3-HYDROXYBUTYRATE COMPOUNDS FOR USE IN REDUCING LIVER FAT

CROSS-REFERENCE TO RELATED APPLICATION(S)

This application is a National Phase Patent Application and claims priority to and the benefit of International Application Number PCT/GB2018/051752, filed on Jun. 22, 2018, which claims priority to British Patent Application Number 1710229.4, filed on Jun. 27, 2017, the entire contents of all of which are incorporated herein by reference.

FIELD OF THE INVENTION

The present invention relates to compounds for use in decreasing liver fat in a subject and to treatments of conditions associated with a fatty liver, for instance, steatosis and liver disease. The invention also relates to prophylactic treatment of a subject to avoid or reduce the risk of developing diseases associated with a fatty liver.

BACKGROUND OF THE INVENTION

Fatty liver, or steatosis, is a term that describes the accumulation of fat in the liver. A subject has a fatty liver when fat makes up at least 5% of the liver by weight.

Fatty liver in subjects can result from a number of different aetiologies. Liver fat is associated with increased age, higher body mass index (BMI), raised blood pressure and type 2 diabetes. Raised liver fat is becoming increasingly common, especially in developed countries and environments where calorie intake is high, for example due to excessive consumption of alcohol or fatty foods. Deposits of fat in the liver cause enlargement, and fibrosis may ensue creating scar tissue, which leads to hardening of the liver, decreased function and ultimately failure. Raised liver fat therefore presents a major concern to public health.

Non-alcoholic fatty liver disease (NAFLD) is a chronic liver disease resulting from excessive fat accumulation in the liver. It is a progressive liver disease which starts with fat accumulation in the liver without excessive alcohol consumption. It is strongly associated with metabolic syndrome (obesity, insulin resistance and dyslipidemia). NAFLD encompasses a spectrum of pathologic conditions, ranging from simple steatosis to non-alcoholic steatohepatitis, cirrhosis and liver cancer. The disease has reached epidemic proportions and is the most common cause of chronic liver disease in Western countries. Approximately 20 to 30% of adults in the general population in Western countries have non-alcoholic fatty liver disease, and its prevalence increases to 70 to 90% among persons who are obese or have diabetes. NAFLD also affects paediatric populations. Due to its close association with obesity, this condition has become the most common liver disease in children in the US.

It has been noted that NAFLD has been associated with increases in morbidity and mortality from cardiovascular disease. Indeed, there is a growing body of evidence that cardiovascular disease is a leading cause of death in patients with advanced NAFLD, and that that this increased risk of cardiovascular disease is independent of the risk conferred by traditional risk factors and components of metabolic syndrome associated with obesity. It is possible that NAFLD may be involved in the pathogenesis of cardiovascular disease.

Fatty liver is usually suspected in patients who have abnormal liver function tests or have an enlarged liver. Fatty liver can be diagnosed using liver needle biopsy. However, as this procedure is painful and is associated with a risk of complications, non-invasive methods for liver fibrosis assessment have been developed in the last decade. Broadly, non-invasive techniques can be divided into those based on direct and indirect serum markers of fibrosis and those based on imaging or electrography. Magnetic resonance techniques can offer an attractive non-invasive option for liver assessment.

Raised liver fat can also be found in subjects who are not overweight, and who are not outwardly showing any signs of liver disease. Public health may be improved by reducing liver fat to normal levels in subjects having raised liver fat, whether or not they are healthy or have a disease associated with raised liver fat or are lean or overweight.

Presently there are no effective approved therapies for the treatment of NAFLD. Typically, subjects are advised to lose weight, take exercise, reduce or avoid alcohol intake and ensure a balanced and healthy diet. Treatment may be recommended for the individual components of the metabolic syndrome, such as insulin sensitizers for diabetes. Weight loss, if the subject is overweight or obese, may improve liver tests, but generally requires the subject to maintain an appropriate exercise and dietary regime, which may prove difficult for many reasons.

Accordingly, there is a need for new and effective treatments for decreasing liver fat in a subject, particularly in those subjects suffering from a fatty liver.

It is generally understood that the term "ketone bodies" encompasses three compounds: D-$\beta$-hydroxybutyrate, acetoacetate and acetone. D-$\beta$-hydroxybutyrate is otherwise known as (R)-3-hydroxybutyrate, and the latter term will be used hereinafter. Ketone bodies are produced by the liver from fatty acids during periods of low food intake.

Ketone bodies and ketone body esters have been shown to reduce serum cholesterol and/or triglyceride levels. For instance, WO2009/089144 discloses a ketone diet which doubled the plasma $\beta$-hydroxybutyrate concentrations after administration. Total serum cholesterol and HDL and LDL levels were significantly lower in rats fed this ketone diet.

Given the difficulty of treating fatty liver, as explained above, one would not have expected compounds effective in reducing fat levels in serum to have the same effect in the liver.

In Kemper et al, Lipids (2015) 50:1185-1193, the effects of ketones on cholesterol homeostasis were studied. The ester R-3-hydroxybutyl R-3-hydroxybutyrate was given to rats which showed lower levels of mevalonate precursors acetoacetyl CoA and HMG-CoA, in the liver, compared to the controls. Levels of liver lanosterol and fatty acid synthetic precursor, malonyl-CoA, were also lower. However, this reference does not disclose or suggest any effect on levels of fat in the liver.

WO 2014/153416 discloses the use of $\beta$-hydroxybutyrate mineral salts in healthy subjects, to improve various metabolic biomarkers, including a reduction in blood glucose levels. The document investigates, inter alia, the amount of weight gain in rats over 4 weeks following dietary ketone supplementation. The effect of ketone supplementation was found to reduce overall weight gain as compared to control animals. The data in WO 2014/153416 show that the weights of the livers of the rats treated with ketone supplementation increased in proportion to the overall increase in body weight. WO 2014/153416 does not suggest that ketone supplementation might have efficacy in selectively targeting accumulated liver fat in a patient suffering, for instance, from steatosis.

Ketone bodies and ketone body esters have also been shown to have various other uses, such as treatment of muscle impairment or fatigue, and protection from radiation exposure. Some of these compounds have also been tested in the liver. For instance, there has been some research which suggests that D-β-hydroxybutyrate could be used to prevent lipid-peroxidation induced liver damage (Mol Endocrinol, August 2015, 29(8):1134-1143). However, these compounds have not been shown to reduce liver fat levels.

US2015/164855 relates to ketone bodies and ketone body esters for maintaining or improving muscle power output. Example 5 uses the specific ester R-3-hydroxybutyrate-R-1,3-butanediol monoester, which is shown to raise blood R-3-hydroxybutyrate concentrations to levels not previously reported with other ketones. Liver fat reduction is not disclosed.

US2007/208081 relates to methods for the formation of oligomeric ketogenic compounds. It discloses in paragraph [0029] that the compounds can be used to treat a variety of neurological and psychiatric disorders. Again, the reduction of liver fat is not disclosed.

It has now been surprisingly found that liver fat may be reduced in a subject irrespective of whether the subject has a disease associated with raised liver fat. Compounds of the invention may be employed to treat healthy subjects, as well as subjects suffering from a disease associated with raised liver fat. Administration of the compounds of the invention may also provide a preventative effect in reducing the risk of a subject developing a disease associated with a fatty liver. Compounds of the invention provide an effective treatment for fatty liver disease including non-alcoholic fatty liver disease (NAFLD), non-alcoholic steatohepatitis (NASH), alcoholic steatohepatitis (ASH) and non-alcoholic fatty liver (NAFL), cirrhosis and hepatocellular carcinoma. As detailed above, up to now, it has been very difficult to control these conditions in the clinic. The invention therefore offers significant advantages for public health.

SUMMARY OF THE INVENTION

The present invention therefore provides, in a first aspect, a compound for use in reducing liver fat in a subject, wherein the compound is selected from:
(i) (R)-3-hydroxybutyrate;
(ii) an ester of (R)-3-hydroxybutyrate; and
(iii) an oligomer obtainable by polymerising (R)-3-hydroxybutyrate moieties;
or a pharmaceutically acceptable salt or solvate thereof.

Also provided, in a second aspect of the invention, is a pharmaceutical composition for use in reducing liver fat, comprising a compound as defined in the first aspect of the invention, and one or more pharmaceutically acceptable excipients.

In a third aspect of the invention there is provided a nutritional composition for use in reducing liver fat comprising a compound as defined in the first aspect of the invention, and optionally further comprising water and one or more of a flavouring, a protein, carbohydrate, sugars, fat, fibre, vitamins and minerals.

In a fourth aspect of the invention there is provided use of a compound as defined in the first aspect of the invention or a composition according to the second or third aspect of the invention in the manufacture of a medicament for use in reducing liver fat in a subject.

In a fifth aspect of the invention there is provided a method of reducing liver fat in a subject comprising administering to the subject a compound as defined in the first aspect of the invention or a composition according to the second or third aspect of the invention.

DETAILED DESCRIPTION OF THE INVENTION

Figure 1:
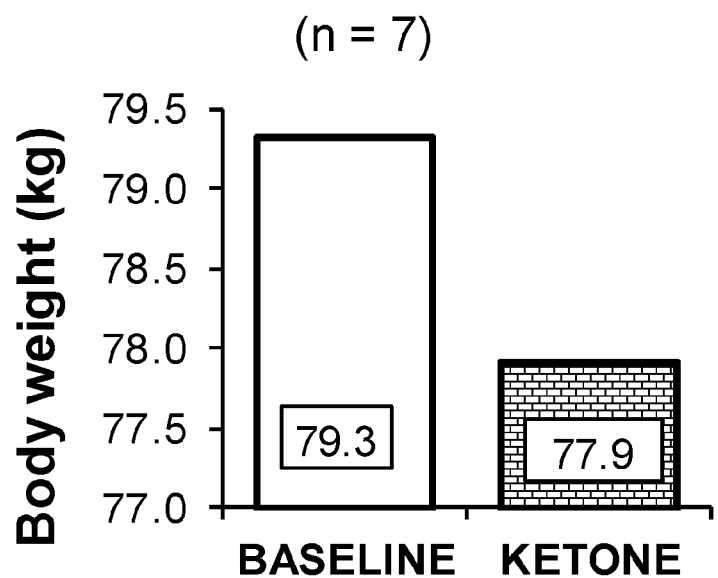
FIG. 1 shows the same weight loss in 7 lean subjects (left) and 3 obese subjects (right) after drinking 393 mg/kg body weight (R)-3-hydroxybutyrate-(R)-1,3-butanediol monoester (ΔG®) 3 times per day for 5 days.
Figure 1:
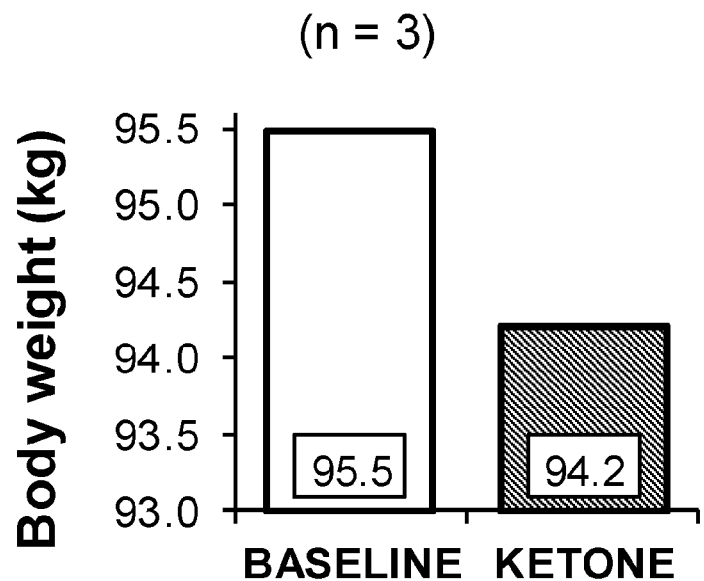

The compounds of the invention provide a source of (R)-3-hydroxybutyrate in the body of the subject. Accordingly, the compound may be (R)-3-hydroxybutyrate itself, or a precursor to (R)-3-hydroxybutyrate, such as an ester or oligomer thereof, which can be broken down in the body to form (R)-3-hydroxybutyrate.

(R)-3-hydroxybutyrate is a ketone body, as defined in "Metabolic Regulation: A Human Perspective" by K N Frayn.

WO2004/108740 discloses that ketone bodies may be administered directly to subjects to achieve elevated levels of ketone bodies. However, direct administration can be difficult and risky under certain circumstances, and the use of esters has therefore been proposed as a preferred alternative. The manufacture of ketone esters has been disclosed, for instance, in WO2014/140308, which describes processes for producing (R)-3-hydroxybutyl (R)-3-hydroxybutyrate.

An ester of (R)-3-hydroxybutyrate can be produced via a transesterification reaction of ethyl-(R)-3-hydroxybutyrate with an alcohol. This reaction may be enzyme catalysed. For instance, an ethyl ester of (R)-3-hydroxybutyrate and (R)-1,3-butanediol may be reacted together in the presence of immobilized lipase under mild vacuum to remove the resultant ethanol by-product.

In a preferred embodiment of the invention, the ester of (R)-3 hydroxybutyrate is a compound of general formula I:

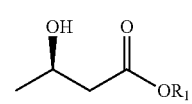

I wherein
$R_1$ is a $C_1$-$C_6$ alkyl group, which alkyl group carries up to five —$OR_2$ substituents,
wherein $R_2$ represents hydrogen, or $C_1$-$C_6$ alkyl or wherein —$OR_2$ represents a (R)-3-hydroxybutyrate moiety; or
$R_1$ is a moiety derived from an alcohol $HOR_1$, wherein said alcohol is a sugar.

Typically, zero, one or two —OR$_2$ groups represent a (R)-3-hydroxybutyrate moiety. Preferably, only zero or one —OR$_2$ groups represent a (R)-3-hydroxybutyrate moiety.

Preferred compounds of the invention are esters, particularly those as outlined in formula I above. The R$_1$ moiety is derived from a corresponding alcohol HO—R$_1$. Alcohol HO—R$_1$ may be, for instance, a mono-alcohol, a di-ol, a polyol, or a sugar.

Preferably, in formula I, R$_1$ is a C$_1$-C$_6$ alkyl group substituted with 0, 1, 2, 3, 4 or 5 —OR$_2$ substituents. Most preferably, R$_1$ is a C$_1$-C$_6$ alkyl group substituted with 1, 2 or 3 —OR$_2$ substituents, typically 1 or 2 —OR$_2$ substituents.

Preferably, R$_2$ is H.

Preferably, R$_1$ has formula —CH$_2$—CH(OH)—CH$_2$(OH) or —CH$_2$—CH$_2$—CH(OH)—CH$_3$. In these cases, R$_1$ is a moiety derived from an alcohol HO—R$_1$ which corresponds to butanediol and glycerol respectively. The butanediol may be racemic 1,3 butanediol. Most preferably, the alcohol HO—R$_1$ corresponds to R-1,3 butanediol. In this case the group R$_1$ is of formula:

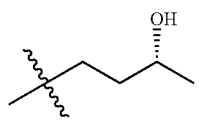

Preferably, the compound of the invention is a monoester, i.e. in cases where the alcohol HO—R$_1$ comprises more than one pendant hydroxyl, only one of these reacts to form a hydroxybutyrate moiety. Partial esters are compounds wherein the alcohol HO—R$_1$ comprises more than one pendant hydroxyl, and not all of these have reacted to form a hydroxybutyrate moiety.

A particularly preferred compound of the invention is (R)-3-hydroxybutyrate (R)-1,3-butanediol monoester, otherwise known as (R)-3-hydroxybutyl-(R)-3-hydroxybutyrate, of formula:

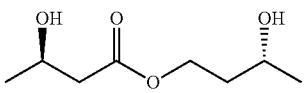

A further preferred compound of the invention is (R)-3-hydroxybutyrate-glycerol partial ester, i.e. (R)-3-hydroxybutyrate-glycerol monoester or diester.

In a different embodiment of the invention, R$_1$ is derived from an alcohol HOR$_1$, wherein said alcohol is a sugar. The sugar may be selected from altrose, arabinose, dextrose, erythrose, fructose, galactose, glucose, gulose, idose, lactose, lyxose, mannose, ribose, ribulose, sucrose, talose, threose, and xylose.

In cases where R$_1$ is derived from an alcohol HOR$_1$ which is a polyol, the polyol may be selected from glycerol, ribitol and xylitol.

In an alternative embodiment of the invention, the compound of the invention is of formula II:

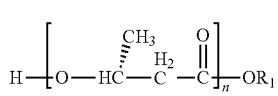

wherein
R$_1$ is as defined above in the first aspect of the invention; and
n is an integer of from 2 to 100.

Preferably, n is from 2 to 50, for instance, 2 to 20, 2 to 10 or 2 to 5. The oligomer may for instance comprise just 2, 3, 4 or 5 repeating units (n=2, 3, 4 or 5). The oligomer may be linear or cyclic in nature.

In a preferred embodiment of the invention, R$_1$ has formula —CH$_2$—CH(OH)—CH$_2$(OH) or —CH$_2$—CH$_2$—CH(OH)—CH$_3$, i.e. the alcohol used to form the ester is glycerol or 1,3 butanediol. The butanediol may be racemic 1,3 butanediol or (R)-1,3 butanediol. Preferably, it is (R)-1,3 butanediol.

When the compounds of the invention contain a chiral centre in addition to that depicted in the formulae above, the compounds may be present as racemic mixtures or pure enantiomeric forms.

Compounds of the invention may be present as physiologically compatible salts. For instance, sodium, potassium, calcium or magnesium salts thereof, may be employed.

We have found that (R)-3-hydroxybutyrate-(R)-1,3-butanediol monoester and (R)-3-hydroxybutyrate-glycerol partial esters provide high circulating levels of (R)-3-hydroxybutyrate in the blood and reduce liver fat. Furthermore, these esters provide a surprisingly high level of uptake in the gut, thereby enabling high blood concentrations of (R)-3-hydroxybutyrate to be achieved upon consumption of a drink.

Accordingly, in a preferred embodiment, the invention provides a hydroxybutyrate ester or partial ester, for example (R)-3-hydroxybutyrate butane-1,3-diol monoester and (R)-3-hydroxybutyrate glycerol partial ester for use in reducing liver fat in a subject.

Particularly advantageous is (R)-3-hydroxybutyl-(R)-3-hydroxybutyrate as it allows a large rise in blood (R)-3-hydroxybutyrate to be achieved with oral ingestion of a smaller volume of material than with racemic ketones. A subject ingesting the material is more readily able to ingest adequate ketone in order to provide a physiologically beneficial response without risk of physical discomfort (due to for instance ingestion of a large volume of liquid, or a bitter/otherwise aversive flavour). The (R)-3-hydroxybutyl-(R)-3-hydroxybutyrate also raises (R)-3-hydroxybutyrate concentrations for a longer period than ketone salts. A lower frequency of doses is then required to maintain raised (R)-3-hydroxybutyrate levels. This also facilitates compliance of the subject with dosing regimens.

Administration of the compounds of the invention to a subject can reduce the level of liver fat in the subject. Advantageously, this reduces the risk of the subject developing a disease associated raised liver fat or being predisposed to developing a disease associated with raised liver fat.

By liver fat, we mean lipids which are stored inside liver cells (hepatocytes). In this context the term "lipids" includes fatty acids and their derivatives, including tri-, di-, monoglycerides and phospholipids. The term liver fat in this invention does not encompass cholesterol or the precursors in cholesterol biosynthesis, such as lanosterol and mevalonate, and the mevalonate precursors acetoacetyl-CoA and HMG-CoA. Nor does the term liver fat encompass fatty acid synthetic precursors, such as malonyl-CoA. Preferably, the term liver fat refers to tri-, di- or monoglycerides only, most typically triglycerides only.

The compounds of the invention are particularly useful for the targeted reduction of fat in the liver, particularly the targeted reduction of accumulated fat in the liver. Accordingly, the reduction of liver fat in this invention is an intended consequence of the treatment, and is not simply the inevitable consequence of a reduction of body fat generally, for instance, in the treatment of obesity. In this targeted treatment, the amount of fat in the liver may be reduced by a greater proportion than the reduction in levels of fat in the body generally.

Compounds of the invention are particularly useful for treatment in those subjects suffering from a fatty liver. The level of fat in the liver may be measured using proton magnetic resonance spectroscopy ($^1$H MRS) to determine percentage of liver fat using methods described in papers by Pavlides M et al (J Hepatol 2016; 64: 308-315) and Thomas E L et al (Gut 2005; 54: 122-127). Using this method, a normal level of fat may be around 2% and a raised or high liver fat may be in excess of 5%, perhaps as high as 20 to 30% in some cases. In this invention, by "fatty liver", we mean a liver having a fat content of more than 5% by weight.

The invention therefore provides a compound as defined previously for use in a subject having a liver with a fat content of at least 5% by weight, to reduce the level of liver fat.

Subjects will have different levels of liver fat depending on their physiology. For example, different subjects may be considered healthy, but have a significantly different BMI and different levels of liver fat due to different physiques. The invention provides benefits in reduction of liver fat in each case.

Suitably, for a subject having a liver fat of 5 to 10% by weight, the compound is given at a level and regime such that the level of fat is reduced by at least 2 percentage points, i.e. to give a final level of liver fat in the range 3 to 8% or less. Where the subject has a liver fat level of 10 to 15%, the level of fat is reduced by at least 5 percentage points, i.e. to give a final level of liver fat in the range 5 to 10% or less. Where the subject has a liver fat level of greater than 15%, the level of fat is reduced by at least 5 percentage points. All percentages are given with respect to the weight of the liver.

In a further aspect the invention provides a compound as defined in the first aspect of the invention, preferably an ester, or a composition according to the invention in treating a subject to reduce liver fat, comprising administering to the subject the compound or composition according to the invention for a period of 5 days wherein the level of fat in the liver is reduced by at least 1 percentage point, preferably by at least 3 percentage points and desirably by at least 5 percentage points. For instance, if the level of fat in the liver starts out at 15% by weight, the level of fat in the liver after treatment is less than 14% by weight, preferably less than 12% by weight, and desirably less than 10% by weight.

Typically the subject is overweight and/or is suffering from a fatty liver.

Suitably the compound of the invention, preferably (R)-3-hydroxybutyrate-(R)-1,3-butanediol monoester, is ingested at a level of at least 100 mg per kilogram of body weight of ketone per day. Desirably, the ketone body or ketone body ester is ingested at a level adequate to provide a blood plasma ketone level of at least 0.1 mM, preferably at least 0.2 mM, more preferably at least 1 mM and optimally at least 2 mM. Suitably the ketone body or ketone body ester is ingested at a level such that the blood plasma ketone level does not exceed 20 mM, suitably does not exceed 10 mM or 8 mM and may not exceed 5 mM.

The blood plasma level of ketone will depend on the body mass of the individual and we have found that oral administration of (R)-3-hydroxybutyrate-(R)-1,3-butanediol monoester of at least 300 mg per kilogram of body weight provides a blood plasma concentration of (R)-3-hydroxybutyrate of around 1.5 mM and administration at 500 mg/kg provides at least 3 mM (R)-3-hydroxybutyrate. At a dose of 1 g/kg of body weight of the subject, the blood (R)-3-hydroxybutyrate concentration is suitably at least 4 mM, preferably 5 mM. Upon oral administration of monoester of 1.5 g/kg of body weight of the subject, the blood (R)-3-hydroxybutyrate concentration is suitably at least 7 mM, preferably at least 8 mM, especially at least 9 mM. A dosing regime comprises multiple drinks consumed separately.

Blood levels of (R)-3-hydroxybutyrate may be determined by commercially available testing kits, for example, (R)-3-hydroxybutyrate can be measured on whole blood using a handheld monitor and reagent strips (Precision Xtra, Abbott Diabetes Care, UK).

The compound of the invention is suitable for treating subjects who have a fatty liver whether they be lean, overweight, obese or severely obese that is a subject having a BMI respectively of under 25, 25 to 29.9, a BMI of 30 to 39 and a BMI of 40 or above to reduce liver fat. The compound is suitable for treating subjects who have diabetes or pre-diabetes to reduce liver fat.

The compound of the invention may be used treat a healthy subject to reduce the level of liver fat or to treat to a subject having a liver disease, for instance a fatty liver disease, including treating non-alcoholic fatty liver disease (NAFLD), non-alcoholic steatohepatitis (NASH), alcoholic steatohepatitis (ASH) and/or non-alcoholic fatty liver (NAFL).

Accordingly, one aspect of the invention provides a compound for use in treating or preventing non-alcoholic fatty liver disease (NAFLD), non-alcoholic steatohepatitis (NASH), alcoholic steatohepatitis (ASH) and non-alcoholic fatty liver (NAFL), wherein the compound is selected from:
  (i) (R)-3-hydroxybutyrate;
  (ii) an ester of (R)-3-hydroxybutyrate; and
  (iii) an oligomer obtainable by polymerising (R)-3-hydroxybutyrate moieties;
or a pharmaceutically acceptable salt or solvate thereof;

Typically, a subject having a fatty liver or fatty liver disease is overweight, obese or severely obese, for example where the subject has a BMI of 25 to 29.9 (overweight), a BMI of 30 to 39.9 (obese) and a BMI of 40 or above (severely obese). The invention is particularly applicable to male subjects having a waist circumference of 94 cm (37 in) and to female subjects having a waist circumference of 80 cm (about 31.5 in) or more.

Compounds of the invention may be included within nutritional compositions. Suitably the nutritional composition comprises water and a source of (R)-3-hydroxybutyrate. Preferably, the composition comprises an ester of (R)-3-hydroxybutyrate, a flavouring and optionally one or more of a protein, carbohydrate, sugars, fat, fibre, vitamins and minerals. Suitably, the flavouring may comprise a fruit-based flavouring. In one embodiment, the flavouring is suitably bitter, for example coffee, chocolate, and cranberry. A bitter flavouring may be combined with other flavourings such as fruit based flavourings, for example grapefruit, raspberry and cranberry.

Compositions useful in the invention may comprise mixtures of isomers of the compounds mentioned above.

The composition is suitably organoleptically acceptable. By "organoleptically acceptable" we mean that the composition must possess acceptable sensory properties of taste, colour, feel and odour.

The composition may comprise a mid-chain triglyceride (MCT). If present, the mid-chain triglyceride preferably comprises a mid-chain triglyceride having a formula $CH_2R_a$—$CH_2R_b$—$CH_2R_c$ wherein $R_a$, $R_b$ and $R_c$ are fatty acids having 5 to 12 carbon atoms. Suitably, $R_a$, $R_b$, and $R_c$ are fatty acids containing a six-carbon backbone (tri-C6:0) as tri-C6:0 MCTs are reported to be absorbed very rapidly by the gastrointestinal tract.

The composition of the invention may comprise L-carnitine or a derivative of L-carnitine. Examples of derivatives of L-carnitine include decanoylcarnitine, hexanoylcarnitine, caproylcarnitine, lauroylcarnitine, octanoylcarnitine, stearoylcarnitine, myristoylcarnitine, acetyl-L-carnitine, O-Acetyl-L-carnitine, and palmitoyl-L-carnitine. Where a carnitine is employed, suitably the composition of the invention comprises i) a ketone body, preferably a ketone monoester, more preferably a (R)-3-hydroxybutyrate monoester and ii) L-carnitine or a derivative of L-carnitine and optionally an MCT.

Where MCT and L-carnitine or its derivative is employed, suitably the MCT is emulsified with the carnitine. Preferably 10 to 500 g of emulsified MCT is combined with 10 to 2000 mg of carnitine for example 50 g MCT (95% triC8:0) emulsified with 50 g of mono- and di-glycerides combined with 500 mg of L-carnitine. Preferably the level of the source of (R)-3-hydroxybutyrate is greater than the level of the MCT.

Compositions according to the invention may be provided in any suitable form, including a solid, for example a powder, tablet, bar, confectionery product or a granule, a liquid, for example a beverage, a gel, a capsule or any other conventional product form. The composition may be a food product, food supplement, dietary supplement, functional food or a nutraceutical or a component thereof.

Examples of food products into which the composition may be incorporated as an additive include snack bars, cereals, confectionery and probiotic formulations including yoghurts. Examples of beverages include soft beverages, alcoholic beverages, energy beverages, dry drink mixes, nutritional beverages and herbal teas for infusion or herbal blends for decoction in water.

A nutraceutical is a food ingredient, food supplement or food product, which is considered to provide a medical or health benefit, including the prevention and treatment of disease. In general, a nutraceutical is specifically adapted to confer a health benefit on the consumer. A nutraceutical typically comprises a micronutrient such as a vitamin, mineral, herb or phytochemical at a higher level than would be found in a corresponding regular food product. That level is typically selected to optimise the intended health benefit of the nutraceutical when taken either as a single serving or as part of a diet regimen or course of nutritional therapy.

The compound of the invention is typically formulated as a nutraceutical.

When in solid form, the composition suitably comprises at least 5% by weight of the compound of the invention, which is preferably an ester, more preferably at least 10% by weight and up to 95% by weight of the composition. Whilst a level of 15 to 30% by weight of a dry composition may be suitable, for example where the composition is a dry powder intended for use with a liquid to produce a liquid composition, a solid bar or product form suitably comprises from 30 to 95%, especially 50 to 95% by weight of the composition.

When the composition is in solid form the composition may further comprise one or more of the following components:

a diluent for example lactose, dextrose, saccharose, cellulose, corn starch or potato starch;

a lubricant for example silica, talc, stearic acid, magnesium or calcium stearate and/or polyethylene glycols;

a binding agent for example starches, arabic gums, gelatin, methylcellulose, carboxymethylcellulose, or polyvinyl pyrrolidone;

a disintegrating agent such as starch, alginic acid, alginates or sodium starch glycolate;

an effervescing agent;

a dyestuff;

a flavouring;

a wetting agent, for example lecithin, polysorbates, lauryl sulphates; and/or a carrier.

Where the composition is in liquid form, the composition suitably comprises a compound of the invention at a level of at least 1%, for example 3 to 40% by weight of the liquid composition but may be higher for example up to 50% by weight of the composition depending on whether the composition is intended to be taken as a single dose or in multiple smaller doses to reach the desired blood ketone level.

The composition in liquid form may comprise several liquid components which are suitably blended together or may comprise liquid and solid components which are mixed with or dissolved in the liquid component as appropriate. In one embodiment, a dry composition comprising the ketone is diluted with a suitable liquid, for example water, fruit juice, yoghurt or milk, preferably at a ratio of 1:1 to 1:10, more preferably 1:3 to 1:7 of dry composition to liquid.

The composition may be provided, as desired, as a liquid product in a form ready for consumption or as a concentrate or paste suitable for dilution on use. The diluent for use with the liquid composition is preferably milk, fruit juice or water.

If desired, the composition may also be provided in encapsulated form, provided that the encapsulation material and the quantity in which it is used is suitable for safe human consumption.

The invention provides in further aspect a kit comprising a compound in accordance with the first aspect of the invention, preferably an ester, or a composition according to the invention, and a ketone monitor and optionally instructions as to the level of product to consume per unit body weight to and a dosage regimen to reduce liver fat. Suitably, the user consumes the product and may then periodically test their blood plasma ketone level to determine whether further ingestion of ketone is required to reach or to maintain a desired blood plasma ketone level.

One aspect of the invention provides compounds of the invention as defined above in a pharmaceutical composition, together with one or more pharmaceutically acceptable excipients.

Compounds of the invention may be present as pharmaceutically acceptable salts. As used herein, a pharmaceutically acceptable salt is a salt with a pharmaceutically acceptable acid or base. Pharmaceutically acceptable acids include both inorganic acids such as hydrochloric, sulphuric, phosphoric, diphosphoric, hydrobromic or nitric acid and organic acids such as citric, fumaric, maleic, malic, ascorbic, succinic, tartaric, benzoic, acetic, methanesulphonic, ethanesulphonic, benzenesulphonic or p-toluenesulphonic acid. Pharmaceutically acceptable bases include alkali metal (e.g. sodium or potassium) and alkali earth metal (e.g. calcium or magnesium) hydroxides and organic bases such as alkyl amines, aralkyl amines and heterocyclic amines.

Compounds of the invention may be present as solvates. The term "solvate" refers to a complex or aggregate formed by one or more molecules of a solute, i.e. compounds of the invention or pharmaceutically-acceptable salts thereof, and one or more molecules of a solvent. Such solvates are typically crystalline solids having a substantially fixed molar ratio of solute and solvent. Representative solvents include by way of example, water, methanol, ethanol, isopropanol, acetic acid, and the like. When the solvent is water, the solvate formed is a hydrate.

The compounds of the invention contain a chiral center. Accordingly, they can be used in the form of a racemic mixture, an enantiomer, or a mixture enriched in one or more stereoisomer. The scope of the invention as described and claimed encompasses the racemic forms of the compounds of the invention as well as the individual enantiomers, and stereoisomer-enriched mixtures.

It will be appreciated that the term "or a pharmaceutically acceptable salt or solvate thereof" is intended to include all permutations of salts and solvates, such as solvates of pharmaceutically-acceptable salts of compounds of the invention.

The pharmaceutical composition of the invention comprises a compound of the invention admixed with one or more pharmaceutically acceptable diluents, excipients or carriers. Even though the compounds of the present invention (including their pharmaceutically acceptable salts, esters and pharmaceutically acceptable solvates) can be administered alone, they will generally be administered in admixture with a pharmaceutical carrier, excipient or diluent, particularly for human therapy. The pharmaceutical compositions may be for human or animal usage in human and veterinary medicine.

Examples of such suitable excipients for the various different forms of pharmaceutical compositions described herein may be found in the "Handbook of Pharmaceutical Excipients, $2^{nd}$ Edition, (1994), Edited by A Wade and P J Weller.

Compositions of the invention (both pharmaceutical and nutritional) may comprise an adsorbent that is pharmaceutically acceptable. Suitably the adsorbent adsorbs the compound of the invention in or on the adsorbent. Advantageously, the flavour of the compound (which may be aversive to taste) is experienced to a lesser degree by the user than would be experienced on consumption of the same composition without the adsorbent. Preferably the adsorbent comprises a lattice or voids capable of retaining the compound of the invention. Any adsorbents used or known for use in food products may be employed. Examples of suitable adsorbents include a polymer hydrogel, for example a polymer of a crosslinked polycarboxylate homopolymer or copolymer, a clathrate, a cyclic oligosaccharide, for example cyclodextrins, and milk powder. The adsorbent may be present at any desired level according to the particular formulation and may be from 5% to 80% by weight of the composition, for example from 10 to 50%.

Typically, the subject of the invention is a mammal, for instance, a human.

Typically, use of the invention involves administering compounds orally, parenterally or intravenously. Oral administration is preferred.

The present invention also provides a compound, as defined herein, in substantially pure form or in association with one or more pharmaceutically acceptable diluents or carriers for use in a method of reducing liver fat in a subject.

As used herein, the term "substantially pure form" typically refers to a compound at a purity of 50% or greater, preferably 75% or greater, more preferably 90% or greater, even more preferably 95% or greater, and most preferably 99% or greater.

The following Example illustrates the invention.

EXAMPLE

The invention is described by reference to the following a non-limiting example.

Example—$^1$H Magnetic Resonance Spectroscopy (MRS) of Liver

Three obese subjects (BMI 33±3 kg/m$^2$) and seven lean subjects (BMI 23±2 kg/m$^2$), matched for age, gender, diabetes duration, treatment and HBA1c, underwent a $^1$H-MRS scan for quantification of liver steatosis.

All subjects were weighed and underwent a treatment regime for five days in which each subject consumed three drinks per day containing 0.393 g/kg body weight of (R)-3-hydroxybutyrate-R-1,3-butanediol monoester, made up to a final volume of 3.3 ml/kg body weight. Table 1 below shows the drink formulation.

TABLE 1

| | | Batchsize (g) 2.9 | | | | |
|---|---|---|---|---|---|---|
| Supplier | Ingredient | % in Flavoured Water | g/batch in Flavoured Water | g/batch in Final Product | Total (g) in Clinical Samples | g/batch in Flavoured Water |
| | Ketone (DeltaG) | | | 0.4 | 6 | |
| | Still water | 99.27 | 2.93 | 2.9 | 47 | 1244.26 |
| | Sucralose | 0.022 | 0.00 | | | 0.28 |
| | Ace K | 0.016 | 0.00 | | | 0.20 |
| | Citric acid | 0.139 | 0.00 | | | 1.74 |
| Chr Hans | ColourFruit Yellow 400 WWS | 0.200 | 0.01 | | | 2.50 |
| Symrise | Orange flavouring (650685) | 0.179 | 0.01 | | | 2.24 |
| Symrise | Pineapple flavouring (651743) | 0.179 | 0.01 | | | 2.24 |
| | TOTAL | 100.00 | 2.95 | 3.3 | 53 | 1253 |

The subjects were not asked to change their normal diet, but did keep diet diaries. Subjects lost 1.3 kg over the five-day period, irrespective of their starting body weight. The weight loss results are shown in FIG. 1. The weight loss in 7 lean subjects (FIG. 1a) and 3 obese subjects (FIG. 1b) was the same, 1.3 kg, after drinking 393 mg/kg body weight (R)-3-hydroxybutyrate-(R)-1,3 butanediol monoester (ΔG®) 3 times per day for 5 days.

Liver $^1$H-MRS was performed on each of the subjects at the beginning and end of the 5 days to determine the change in liver fat. The $^1$H-MRS measurements were carried out on a 3 T Siemens Tim Trio using a whole-body coil and 6-channel anterior plus 24-channel posterior phased-array coils for signal receiving. To obtain hepatic $^1$H-MRS, an 8-ml voxel (2×2×2) was positioned in the liver, avoiding gross vascular, biliary structures and adipose tissue depots. Spectra, with and without water suppression, were obtained to calculate hepatic triglyceride content as a percentage relative to water (triglyceride/water×100). A calibration pulse sequence was implemented to evaluate the optimal water suppression pulse scaling factor. Individual coil signals were combined within Matlab using specifically written modules. The water-suppressed scans were constructively averaged, including frequency correction. Spectra were quantified using the Advanced Method of Accurate, Robust and Efficient Spectroscopic (AMARES) fitting algorithm. Metabolite peaks (including lipid/triglycerides) were analyzed and prior knowledge was used for all peak locations by using soft constraints. All peaks were fitted using Lorentzian lineshapes.

Results

The weight loss results (FIG. 1) demonstrate that the invention allows both healthy and obese subjects to lose weight. In the lean subjects, no loss of liver fat was observed (2.3 and 2.5%). The liver triglyceride levels in the obese subjects had fallen by approximately 3.4% (17.5 to 14.1%) in 5 days. The results are plotted in FIG. 2, together with images of a normal/lean liver and a fatty liver. It will be observed that islands of fat are present in the image of the fatty liver.

Figure 2A:
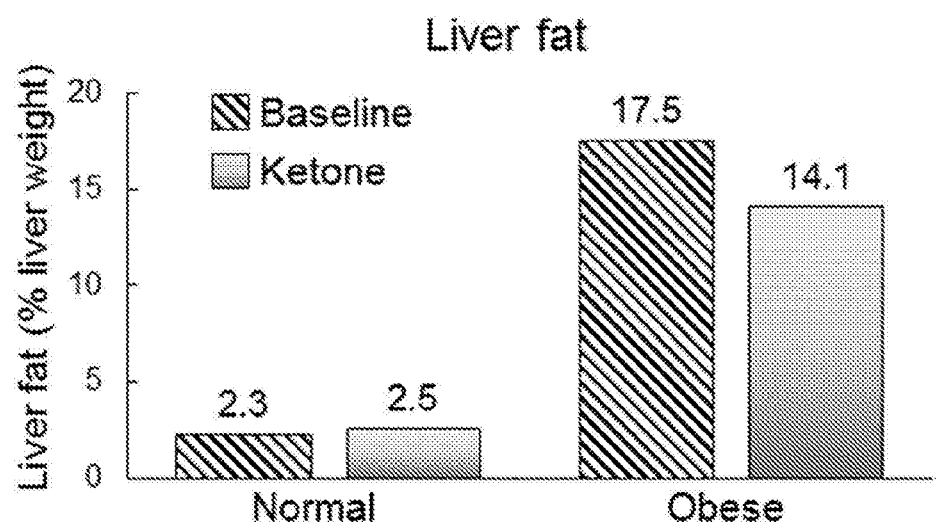
FIG. 2a compares no loss of liver fat in 7 lean subjects with a decrease in liver fat in 3 obese subjects after drinking 393 mg/kg body weight (R)-3-hydroxybutyrate-(R)-1,3-butanediol monoester (ΔG®) 3 times per day for 5 days (upper panel)
Figure 2B:
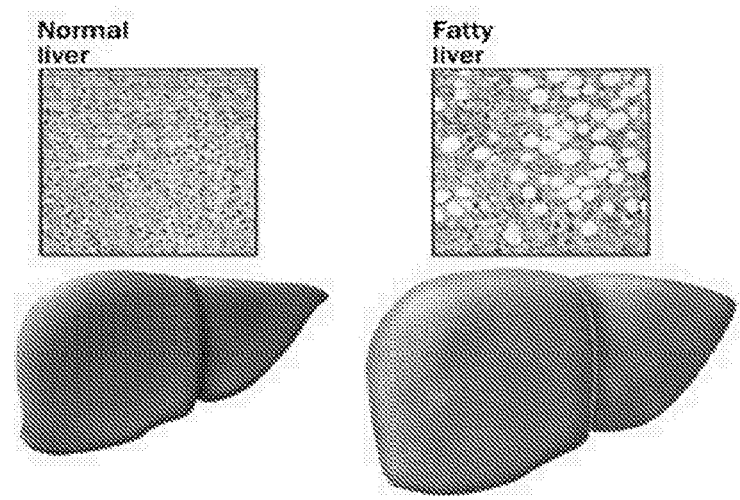
FIG. 2b shows the histology of a normal and a fatty liver, with a diagram of each.

FIG. 2a shows a decrease in liver fat of 3.4% in 3 obese subjects, with no loss of liver fat in 7 lean subjects after drinking 393 mg/kg body weight (R)-3-hydroxybutyrate-(R)-1,3 butanediol monoester (ΔG®) 3 times per day for 5 days. FIG. 2b illustrates the histology of a normal and a fatty liver, with a diagram of each. There are clear differences in the histology of these samples.

Figure 3A:
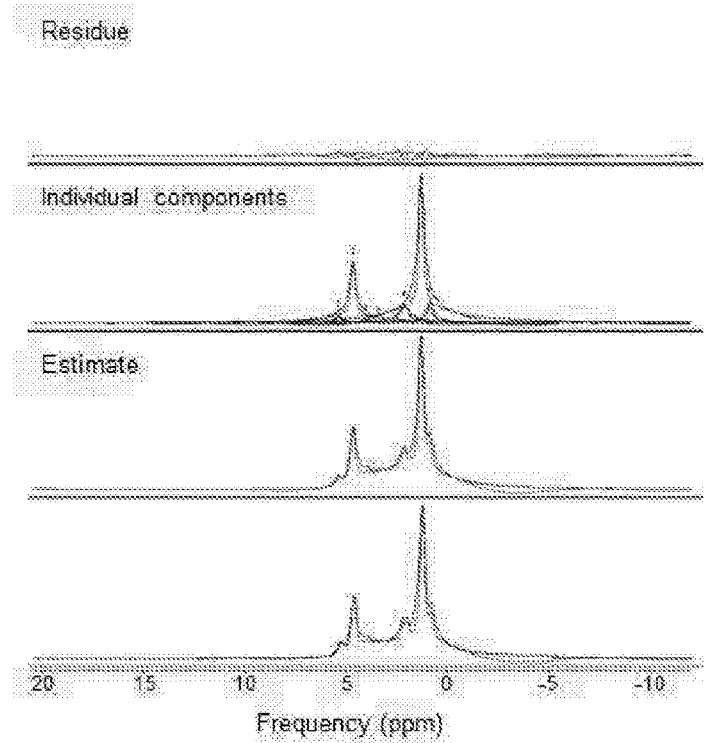
FIG. 3a shows the $^1$H Magnetic resonance spectrum of a normal liver (bottom panel) showing fitting of the spectrum for quantification of liver fat (upper 3 panels)
Figure 3B:
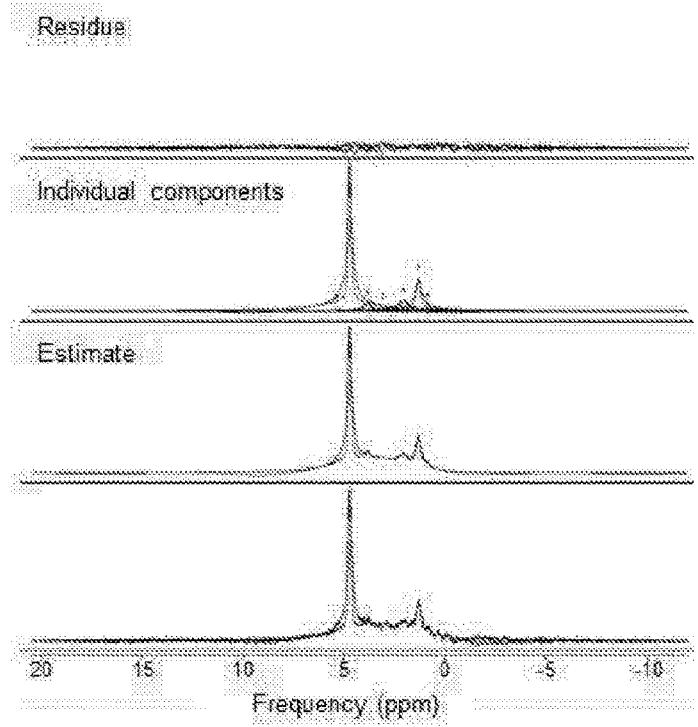
FIG. 3b shows the $^1$H Magnetic resonance spectrum of a fatty liver (bottom panel) showing fitting of the spectrum for quantification of liver fat (upper 3 panels).

Representative examples of $^1$H-MRS spectra in a lean and an obese subject are shown in FIGS. 3a and 3b, respectively. FIG. 3a shows the $^1$H-MR spectrum of a lean subject with an hepatic triglyceride level of 2.6%. This is a $^1$H Magnetic resonance spectrum of a normal liver (bottom panel) showing fitting of the spectrum for quantification of liver fat (upper 3 panels).

FIG. 3b shows the $^1$H-MR MR spectrum of an obese subject with an hepatic triglyceride level of 16.1%. This is a $^1$H Magnetic resonance spectrum of a fatty liver (bottom panel) showing fitting of the spectrum for quantification of liver fat (upper 3 panels).

As can be seen, $^1$H-MR can be used to diagnose subjects suffering from a fatty liver.

The invention claimed is:

1. A method of reducing liver fat in a subject having a fatty liver, but not non-alcoholic steatohepatitis or alcoholic steatohepatitis, the method comprising orally administering to the subject (R)-3-hydroxybutyl-(R)-3-hydroxybutyrate or a pharmaceutically acceptable salt or solvate thereof in an amount of the (R)-3-hydroxybutyl-(R)-3-hydroxybutyrate effective to reduce liver fat in the subject.

2. The method according to claim 1, wherein the subject has liver fat of greater than 5% by weight.

3. The method according to claim 1, wherein the subject is overweight (having a BMI in the range of 25 to less than 30), obese (having a BMI in the range of 30 to less than 40) or severely obese (having a BMI of 40 or above).

4. The method according to claim 1, wherein the subject is diabetic or pre-diabetic.

5. A method of reducing liver fat in a subject having a fatty liver, but not non-alcoholic steatohepatitis or alcoholic steatohepatitis, the method comprising orally administering to the subject a pharmaceutical composition, wherein the pharmaceutical composition consists essentially of (R)-3-hydroxybutyl-(R)-3-hydroxybutyrate or a pharmaceutically acceptable salt or solvate thereof, one or more pharmaceutically acceptable excipients, and optionally a mid chain triglyceride, the orally administering comprising administering the pharmaceutical composition in an amount sufficient to provide an amount of the (R)-3-hydroxybutyl-(R)-3-hydroxybutyrate effective to reduce liver fat in the subject.

6. A method of reducing liver fat in a subject having a fatty liver, but not non-alcoholic steatohepatitis or alcoholic steatohepatitis, the method comprising orally administering to the subject a nutritional composition, wherein the nutritional composition consists essentially of:
(R)-3-hydroxybutyl-(R)-3-hydroxybutyrate or a pharmaceutically acceptable salt or solvate thereof,
water,
one or more of a flavouring, a protein, a carbohydrate, a sugar, a fat, fiber, a vitamin, and a mineral, and
optionally a mid chain triglyceride,
the orally administering comprising administering the nutritional composition in an amount sufficient to provide an amount of the (R)-3-hydroxybutyl-(R)-3-hydroxybutyrate effective to reduce liver fat in the subject.

7. The method according to claim 6, wherein the nutritional composition further comprises the mid chain triglyceride.

8. The method according to claim 1, by targeted reduction of liver fat in the subject.

9. The method according to claim 1, wherein the administering comprises administering the (R)-3-hydroxybutyl-(R)-3-hydroxybutyrate or the pharmaceutically acceptable salt or solvate thereof to the subject at a dosage greater than 100 mg/kg per day.

10. The method according to claim 1, wherein the administering comprises administering the (R)-3-hydroxybutyl-(R)-3-hydroxybutyrate or the pharmaceutically acceptable salt or solvate thereof to the subject at a dosage greater than 300 mg/kg per day.

11. The method according to claim 1, wherein the administering comprises administering the (R)-3-hydroxybutyl-(R)-3-hydroxybutyrate or a pharmaceutically acceptable salt or solvate thereof at a level such that the subject's blood plasma ketone level does not exceed 8 mM.

12. The method according to claim 1, wherein the subject has a liver fat of up to 20 or 30%.

13. The method according to claim 1, wherein the liver fat comprises lipids stored inside hepatocytes.

14. The method according to claim 1, wherein the subject has a liver fat of 5 to 10% by weight, and the (R)-3-hydroxybutyl-(R)-3-hydroxybutyrate or pharmaceutically acceptable salt or solvate thereof is given at a level and regime such that the level of fat is reduced by at least 2 percentage points.

15. The method according to claim 1, wherein the subject has a liver fat of 10 to 15% by weight, and the (R)-3-hydroxybutyl-(R)-3-hydroxybutyrate or pharmaceutically acceptable salt or solvate thereof is given at a level and regime such that the level of fat is reduced by at least 5 percentage points.

16. The method according to claim 1, wherein the subject has a liver fat of greater than 15% by weight, and the (R)-3-hydroxybutyl-(R)-3-hydroxybutyrate or pharmaceutically acceptable salt or solvate thereof is given at a level and regime such that the level of fat is reduced by at least 5 percentage points.

17. The method according to claim 1, wherein the (R)-3-hydroxybutyl-(R)-3-hydroxybutyrate or pharmaceutically acceptable salt or solvate thereof is administered at a dosage greater than 500 mg/kg per day.

18. The method according to claim 1, wherein the (R)-3-hydroxybutyl-(R)-3-hydroxybutyrate or pharmaceutically acceptable salt or solvate thereof is administered at a dosage greater than 1 g/kg per day.

19. The method according to claim 1, wherein the (R)-3-hydroxybutyl-(R)-3-hydroxybutyrate or pharmaceutically acceptable salt or solvate thereof is administered at least once per day.

20. The method according to claim 2, wherein the liver fat is measured using proton magnetic resonance spectroscopy ($^1$H MRS).

* * * * *